US009038320B1

(12) United States Patent
Deakins et al.

(10) Patent No.: US 9,038,320 B1
(45) Date of Patent: May 26, 2015

(54) DOWNSPOUT FOR A GUTTER SYSTEM WITH AN INTEGRATED RAINWATER HOLDING CHAMBER

(71) Applicants: Jeremy Deakins, Salisbury, NC (US); Justin Bouknight, Cayce, SC (US)

(72) Inventors: Jeremy Deakins, Salisbury, NC (US); Justin Bouknight, Cayce, SC (US)

( * ) Notice: Subject to any disclaimer, the term of this patent is extended or adjusted under 35 U.S.C. 154(b) by 0 days.

(21) Appl. No.: 14/580,527

(22) Filed: Dec. 23, 2014

Related U.S. Application Data

(60) Provisional application No. 61/935,893, filed on Feb. 5, 2014.

(51) Int. Cl.
| | |
|---|---|
| *E04D 13/00* | (2006.01) |
| *E04D 13/076* | (2006.01) |
| *E04D 13/04* | (2006.01) |
| *E04D 13/064* | (2006.01) |
| *E04D 13/08* | (2006.01) |

(52) U.S. Cl.
CPC ........ *E04D 13/0767* (2013.01); *E04D 13/0481* (2013.01); *E04D 13/0645* (2013.01); *E04D 13/08* (2013.01); *E04D 2013/0495* (2013.01); *E04D 2013/0866* (2013.01); *E04D 2013/086* (2013.01); *E04D 2013/0873* (2013.01); *E04D 2013/0893* (2013.01)

(58) Field of Classification Search
CPC . E04D 13/0767; E04D 13/0481; E04D 13/08; E04D 13/0645; E04D 2013/0873; E04D 2013/086; E04D 13/0893
USPC ....................................................... 52/11–16
See application file for complete search history.

(56) References Cited

U.S. PATENT DOCUMENTS

| 115,340 | A | * | 5/1871 | Miller ................................ 52/16 |
|---|---|---|---|---|
| 4,472,274 | A | * | 9/1984 | Williams ...................... 210/163 |
| 5,114,594 | A | * | 5/1992 | Rosebrock et al. ........... 210/767 |
| 5,533,303 | A | * | 7/1996 | Harvey ............................ 52/16 |
| 5,985,158 | A | * | 11/1999 | Tiderington .................... 210/767 |
| 6,526,699 | B1 | * | 3/2003 | Foglio, Sr. ...................... 52/15 |
| 6,941,702 | B1 | * | 9/2005 | Abrams et al. .................... 52/16 |
| 6,966,333 | B1 | * | 11/2005 | Kuehneman .................. 137/357 |
| 7,395,633 | B2 | * | 7/2008 | Baeta ................................ 52/16 |
| 8,424,557 | B1 | * | 4/2013 | Russell ........................ 137/357 |
| 2003/0051414 | A1 | * | 3/2003 | Bessette ............................ 52/16 |
| 2005/0109693 | A1 | * | 5/2005 | Allard ........................... 210/446 |
| 2008/0229673 | A1 | * | 9/2008 | LaMorte et al. ................... 52/12 |
| 2009/0031625 | A1 | * | 2/2009 | McAvoy et al. ................ 47/48.5 |
| 2010/0193046 | A1 | * | 8/2010 | Moroder et al. .............. 137/357 |
| 2010/0200482 | A1 | * | 8/2010 | Perlatti .................... 210/170.03 |
| 2012/0240480 | A1 | * | 9/2012 | Hutchings, Jr. ................... 52/16 |
| 2012/0324803 | A1 | * | 12/2012 | Sullivan et al. ................... 52/12 |
| 2013/0111824 | A1 | * | 5/2013 | Rees ............................... 52/12 |

* cited by examiner

*Primary Examiner* — Joshua J Michener
*Assistant Examiner* — Keith Minter

(57) ABSTRACT

A gutter downspout is provided and includes an integrated rainwater holding chamber for collecting and holding rainwater and also includes a bypass chamber. Rainwater collected by the gutter system is directed into the gutter downspout where at least a portion of the rainwater is directed into the rainwater holding chamber where it accumulates over time. When the rainwater holding chamber is filled, the additional rainwater directed into the gutter downspout is directed into a bypass chamber disposed adjacent the rainwater holding chamber. Rainwater flows through the bypass chamber and out the bottom of the gutter downspout.

17 Claims, 8 Drawing Sheets

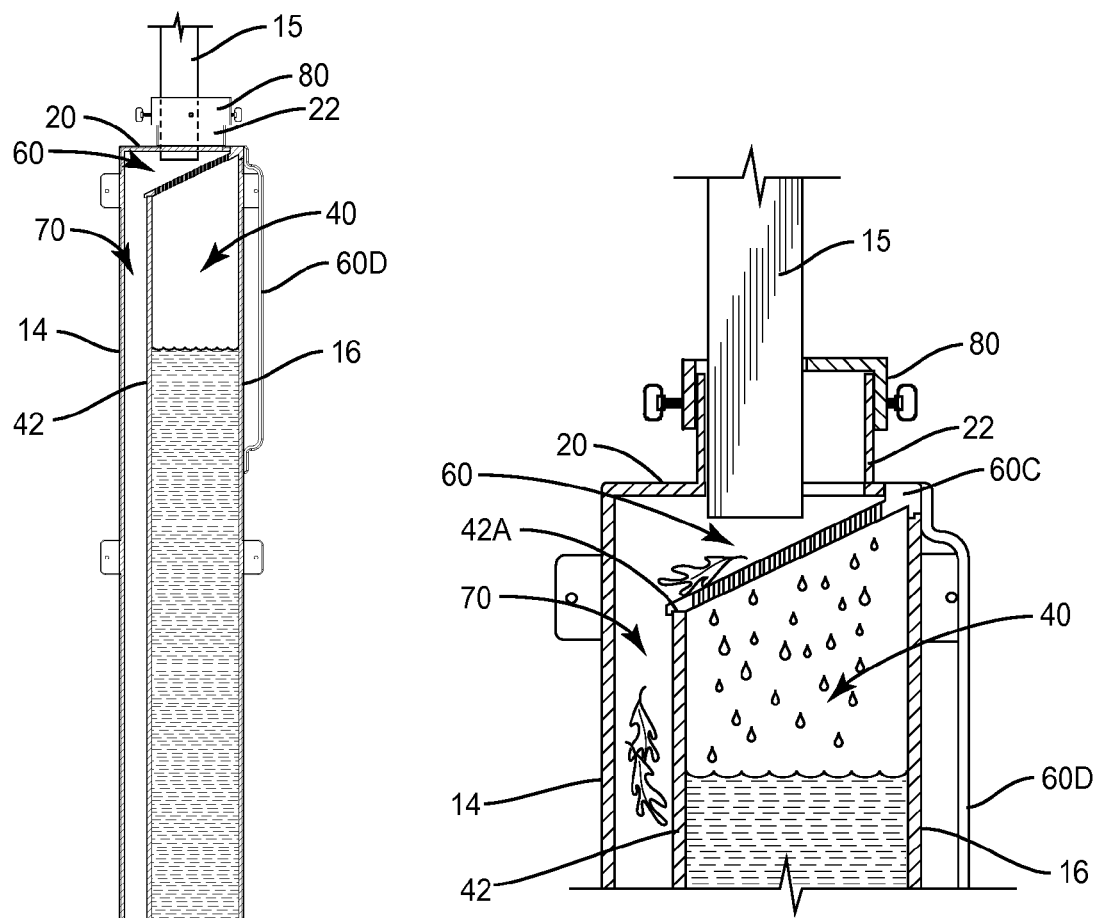
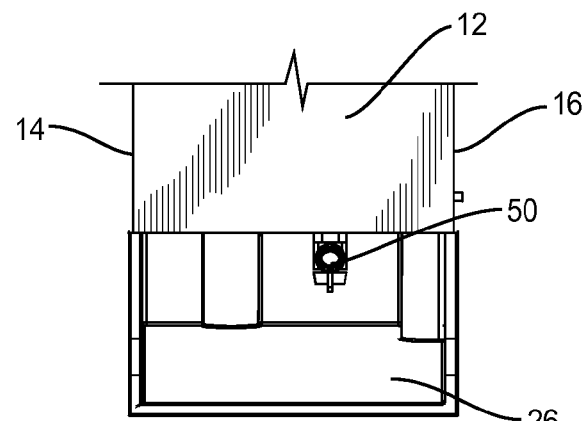
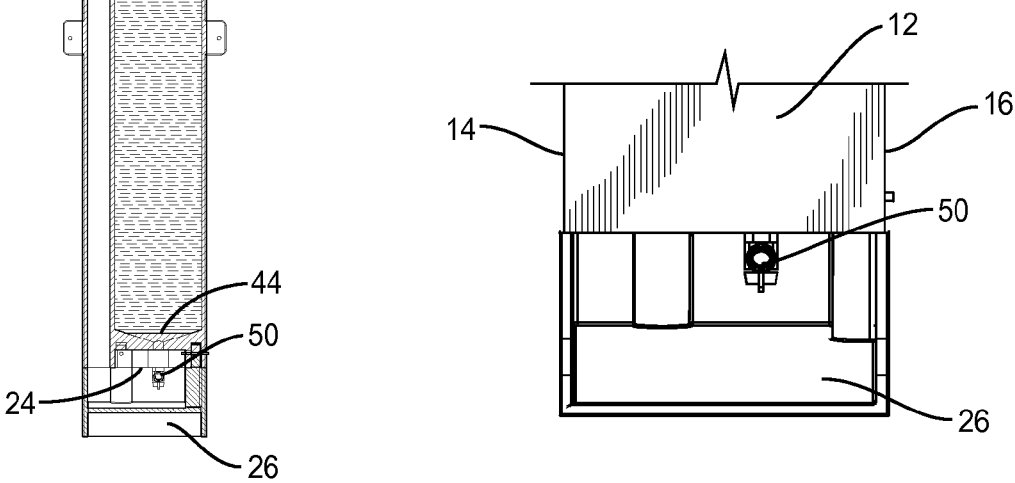
FIG. 8
FIG. 9
FIG. 10

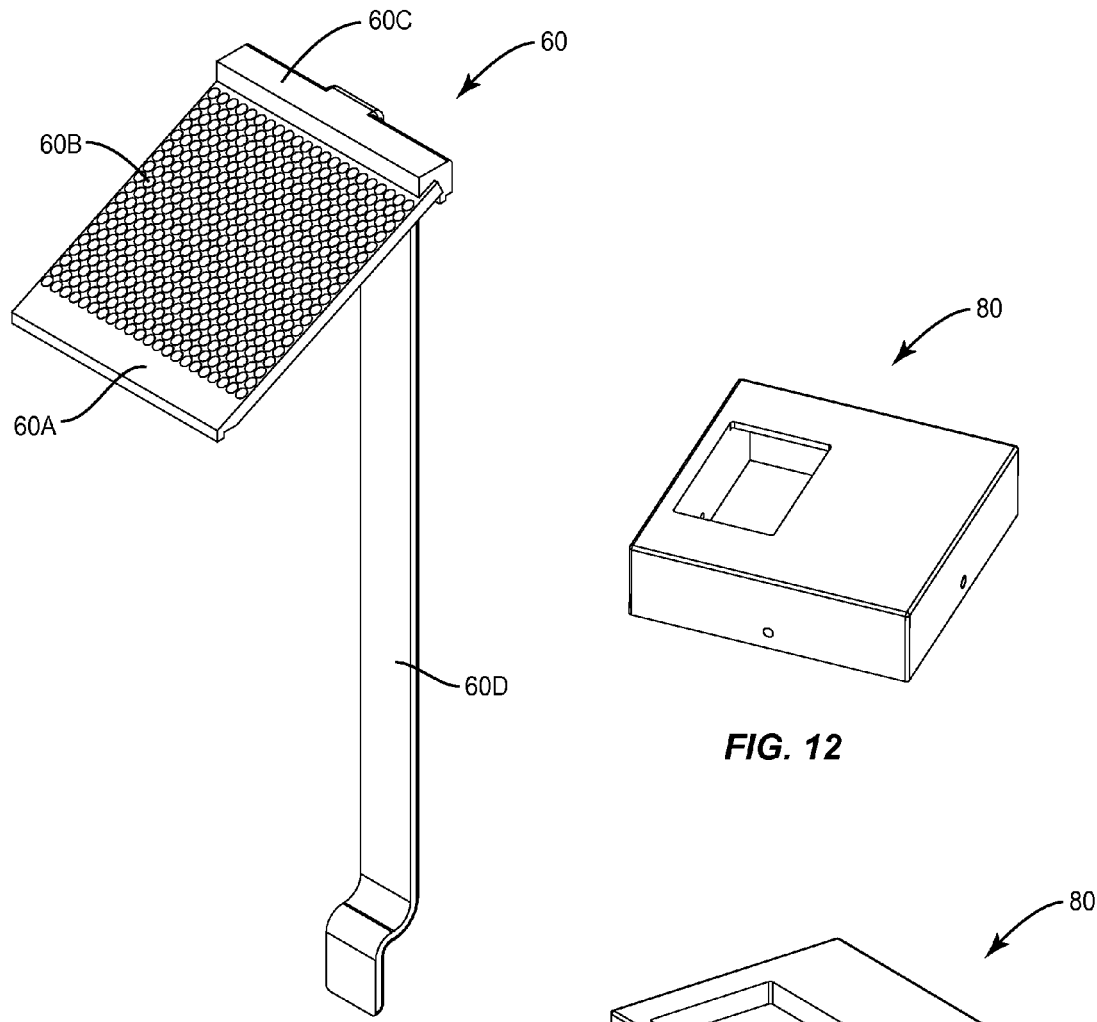

DOWNSPOUT FOR A GUTTER SYSTEM WITH AN INTEGRATED RAINWATER HOLDING CHAMBER

This application claims priority under 35 U.S.C. §119(e) from the following U.S. provisional application: Application Ser. No. 61/935,893 filed on Feb. 5, 2014. That application is incorporated in its entirety by reference herein.

FIELD OF THE INVENTION

The present invention relates to gutter systems and more particularly to a downspout for use in conjunction with a gutter system where the downspout includes an integrated rainwater holding chamber.

BACKGROUND

Water conservation and access to water is a growing concern around the world. In many towns and municipalities there are watering restrictions during times of little rainfall or drought. People have responded favorably to ideas that allow for rainwater to be collected and stored for later use such as gardening and other outdoor purposes. However, until now the options for collecting rainwater have been limited to the use of underground cisterns or varying designs of large, unattractive rain barrels. There are a number of existing patents for devices to collect and store rainwater. However, many of these are variations of the large, unsightly barrel design. Because of the unattractive and cumbersome designs of existing patented devices, rain collection systems are not as widely used as they could be. There are two prevailing reasons for this. First, until now, one has to compromise a pleasing appearance for utility. Second, any utility that may be realized is further compromised by the fact that barrels can overflow causing large amounts of water to pool at or near the foundation of a dwelling. This can cause erosion or saturation at the foundation level of the building or dwelling. The fact that existing devices are unattractive will cause many people to forego their use because they would only place a barrel type device where it could not be seen publicly due to the diminution of curb appeal that is present with existing devices.

Some existing rain collection devices can filter debris and some cannot. Of those devices containing filters, many have them positioned such that the tank or barrel must be opened to clean or change the filter. This can be both complicated and inconvenient for the user. If the device has no filter, debris will easily enter the device wherein water is stored. If this happens, it can cause a problem with water egress causing further complications with use of the device.

The need exists for an improved rainwater collection device that is simple to use and attractive in both form and function.

SUMMARY OF THE INVENTION

A downspout for a gutter system includes an integrated rainwater holding chamber for collecting and holding water. One embodiment for the rainwater holding chamber is formed inside the downspout and designed to receive and hold water directed into the downspout. Once the rainwater holding chamber is full, additional water entering the downspout is diverted past the rainwater holding chamber through a bypass chamber and out the downspout in conventional fashion.

In one embodiment, the downspout in designed to be connected to a gutter system for collecting and holding water passing through the gutter system. In this embodiment, the downspout includes an elongated outer housing having a surrounding wall, an upper end portion and a lower end portion, and wherein the elongated housing is adapted to connect to the gutter system and to extend downwardly therefrom. An inlet is formed in the top portion of the downspout and an outlet is formed in the bottom portion of the downspout. An elongated integrated rainwater holding chamber is formed inside the housing of the downspout and wherein the rainwater holding chamber extends substantially along the length of the downspout and includes an opening in a top portion thereof for permitting rainwater to flow from the inlet chamber. A valve is formed in a lower portion of the rainwater holding chamber for controlling the flow from the chamber. The downspout further includes a rainwater bypass chamber formed adjacent the rainwater holding chamber and disposed inside the downspout for permitting rainwater to flow through the bypass chamber and to bypass the rainwater holding chamber in certain situations.

In another embodiment, the gutter downspout described above is provided with a filter slot formed in the downspout housing adjacent the opening in the rainwater holding chamber. A removable filter extends across the opening in the rainwater holding chamber for filtering debris from the rainwater passing into the rainwater holding chamber. A filter handle is attached to the filter and projects therefrom through the filter slot and then turns such that the handle extends along an exterior side of the downspout.

Other objects and advantages of the present invention will become apparent and obvious from a study of the following description and the accompanying drawings which are merely illustrative of such invention.

BRIEF DESCRIPTION OF THE DRAWINGS

FIG. 8 is a front elevational view of the gutter downspout with a front panel of the housing removed to better illustrate the internal structure of the downspout.

FIG. 9 is a fragmentary sectional view showing the upper portion of the gutter downspout.

FIG. 10 is a fragmentary elevational view showing the lower portion of the gutter downspout.

FIG. 11 is a perspective view showing the filter used in the downspout.

FIG. 12 is a perspective view of one cap adaptor that is designed to connect to the upper portion of the downspout.

FIG. 13 is a perspective view of another cap adaptor adapted to connect to the downspout.

DESCRIPTION OF THE PREFERRED EMBODIMENT

With further reference to the drawings, a gutter downspout with an integrated rainwater holding chamber is shown therein and indicated generally by the numeral 10. As will be appreciated from subsequent portions of this disclosure, the downspout 10 includes an internal rainwater holding chamber 40 that collects water passing through the downspout. When the rainwater holding chamber 40 is filled, water entering the downspout 10 will bypass the rainwater holding chamber and move through and out the downspout in conventional fashion.

Figure 1:
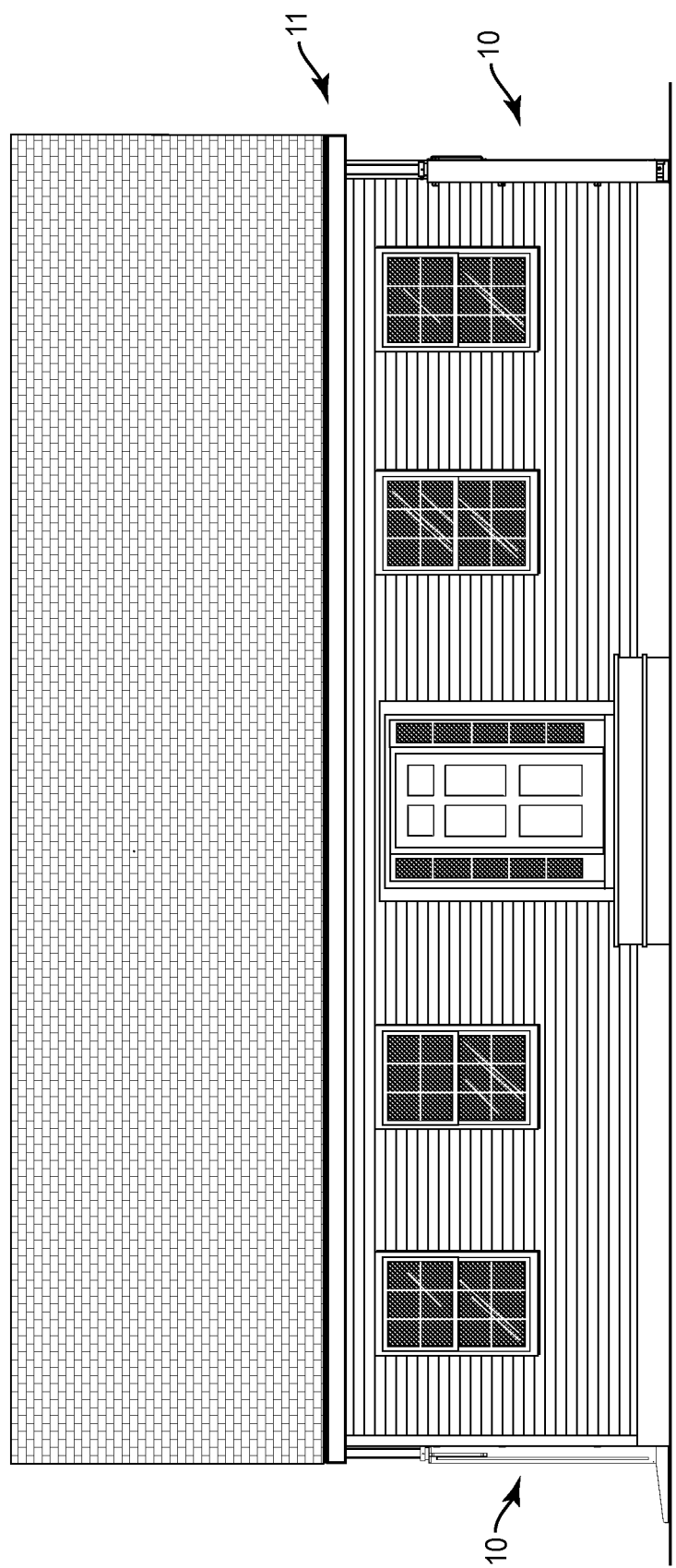
FIG. 1 is a front elevational view of a house having a gutter system and the gutter downspout of the present invention.
Figure 2:
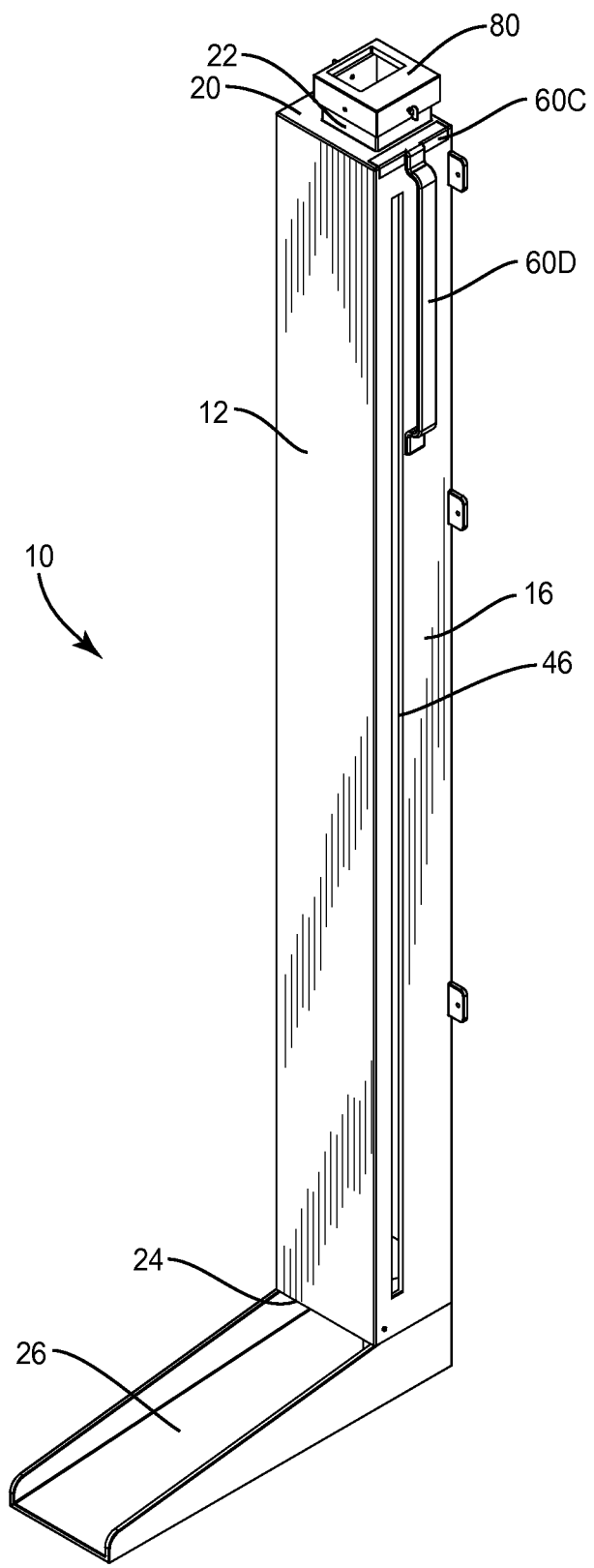
FIG. 2 is a perspective view of the gutter downspout.
Figure 3:
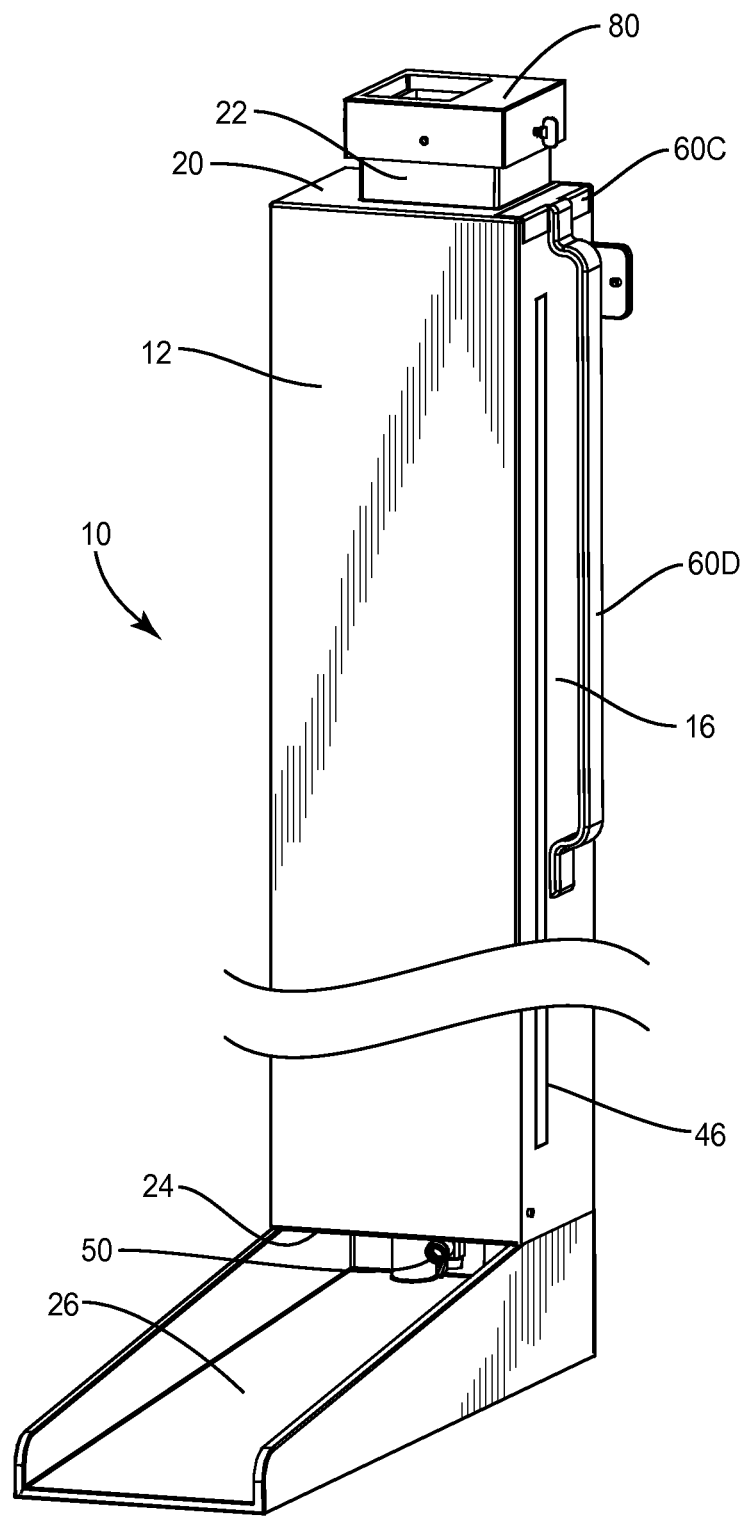
FIG. 3 is an enlarged perspective view of the gutter downspout.
Figure 4:
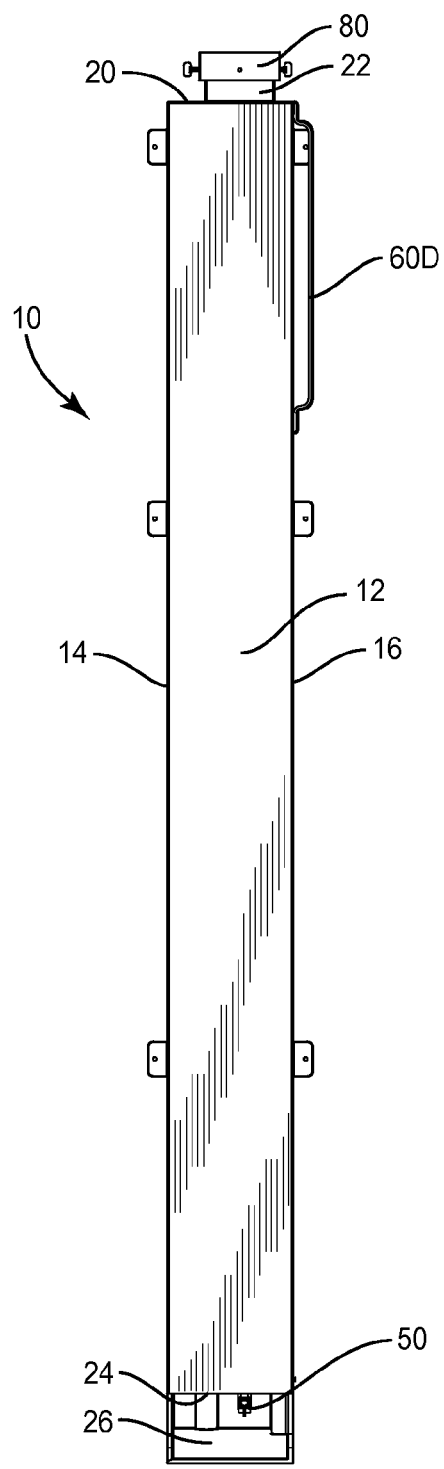
FIG. 4 is a front elevational view of the gutter downspout.
Figure 5:
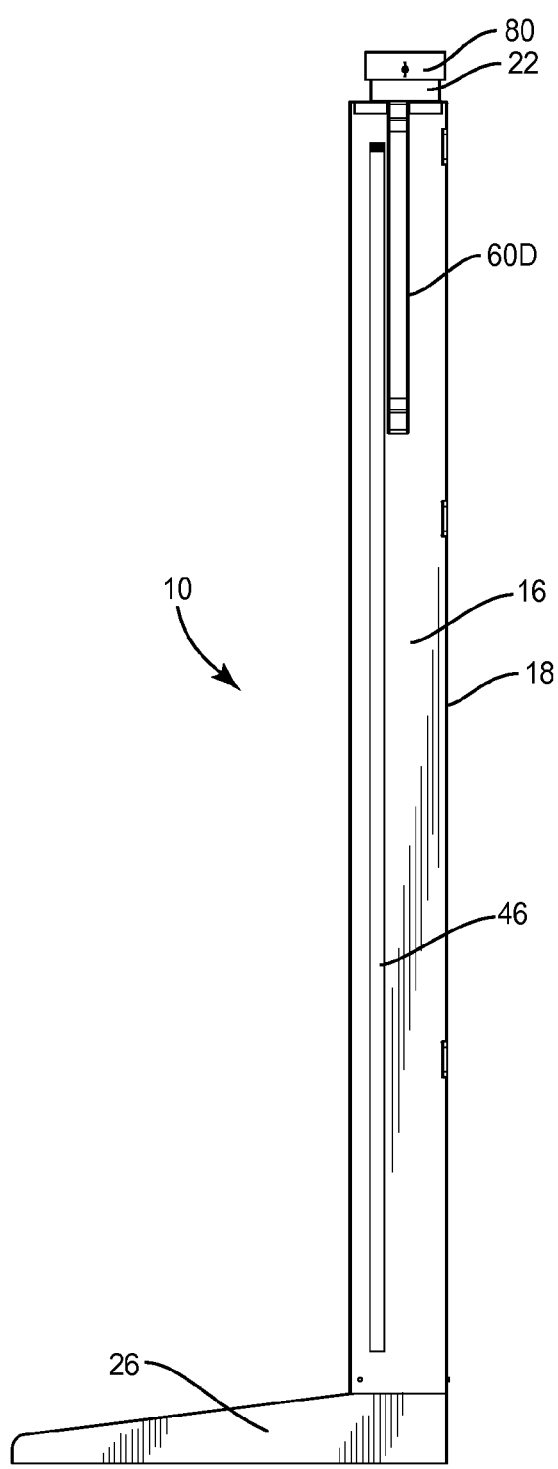
FIG. 5 is a side elevational view of the gutter downspout.
Figure 6:
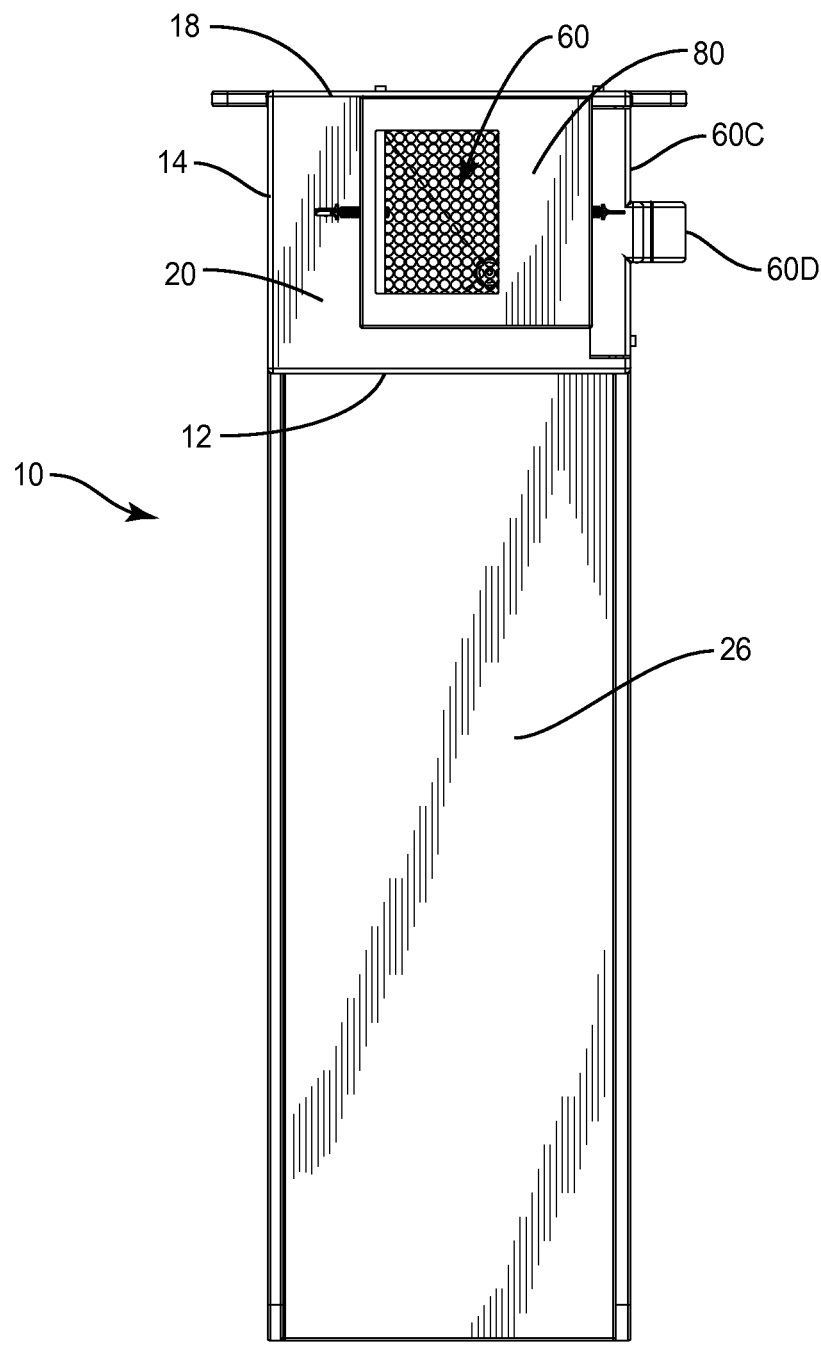
FIG. 6 is a top plan view of the downspout of the present invention.

As shown in FIG. 1, the gutter downspout 10 is designed to be operatively connected to a gutter system indicated generally by the numeral 11. As will be appreciated, rainwater falling on the roof of the house shown in FIG. 1 will gravitate downwardly into the gutter system 11 and the rainwater collected in the gutter system 11 is directed to downcomer or down flow pipes which are connected to an upper end portion of the respective gutter downspouts 10.

Turning to a more detailed discussion of the downspout 10 shown in the drawings, the downspout includes a front wall 12. There is also provided a pair of sidewalls 14 and 16. Sidewall 14 is referred to as a left sidewall and sidewall 16 is referred to as a right sidewall. There is also provided a back wall 18. Walls 12, 14, 16 and 18 form the outer structure or housing of the downspout. These walls form a surrounding wall. It is appreciated that the downspout 10 can be constructed of various materials such as sheet metal, plastic and the like. Further, it is appreciated that the shape or design of the downspout 10 can vary. For example, the downspout 10 in cross-section can be square, rectangular, circular or other shapes.

As shown in FIG. 8, the downspout 10 includes a top 20. Extending upwardly from an opening in the top 20 is a sleeve or inlet 22. Note that the sleeve or inlet 22 is secured in an opening in the top 20. Thus, rainwater entering the inlet 22 is able to flow directly into the interior area of the downspout 10.

The lower portion of the downspout 10 includes a bottom 24. A portion of the bottom is closed but another portion of the bottom is open. As will be discussed below, there is a bypass chamber 70 formed in the downspout 10. This bypass chamber 70 extends the full length of the downspout 10 and is open at the bottom to permit rainwater to pass therefrom.

In one embodiment, there is a splash pad or block 26 provided with the downspout 10. In some cases, the splash block 26 can be integral with the downspout 10 and in other cases the splash block can be designed to be connected to the bottom portion of the downspout. Note in FIG. 7 where the splash pad 26 includes a series of upstanding mounting studs 26A. The lower end or lower portion of the downspout 10 is provided with receptors for receiving these mounting studs 26. Hence, the downspout 10 can be easily connected to the splash block 26 by aligning the receptors (not shown) formed in the bottom of the downspout with the upstanding mounting studs 26A. To secure the downspout 10 to the splash block 26, a series of screws or fasteners 26B can be screwed through the housing of the downspout and into the studs 26A to securely connect the downspout with the splash block 26A. In some instances, the screws 26B may not be necessary as the downspout can simply be set down on the splash block 26 with the mounting studs 26A being sufficient to maintain an appropriate alignment and connection with the downspout 10.

The integrated rainwater holding chamber discussed above and referred to by the numeral 40 in the drawings is shown in several drawings, particularly FIG. 8. Integrated rainwater holding chamber 40 includes a wall structure that forms a water holding receptacle in the downspout 10. Rainwater holding chamber 40 utilizes a number of the walls of the housing of the downspout 10. In one embodiment, the rainwater holding chamber 40 is formed partially by the right sidewall 16, the front wall 12 and the back wall 18 of the downspout. As seen in FIG. 8, there is also provided an intermediate wall, sometimes referred to as an internal wall 42, which forms a part of the rainwater holding chamber. Intermediate wall 42 is spaced inwardly from the left sidewall 14. It is also seen where the intermediate wall 42 includes an upper terminal edge 42A that is spaced downwardly from the top 20 of the downspout 10. See FIG. 9, for example. Thus it is seen from FIG. 9 that there is an opening formed at the top of the rainwater holding chamber 40 and that this opening is bound by walls 12, 16 and 18, along with the intermediate wall 42.

The bottom of the rainwater holding chamber 40 is closed. That is, the rainwater holding chamber 40 includes a bottom 44 that is tapered inwardly towards a drain port. There is provided an outlet in the bottom of the rainwater holding chamber 40 and disposed on the end of the outlet is a control valve 50. See FIGS. 8 and 10. This means that rainwater can be accumulated in the rainwater holding chamber 40 over a period of time and that the homeowner can selectively use the accumulated rainwater by actuating the control valve 50. The control valve 50 can assume various designs and configurations. It will include an actuating handle or knob or the like for opening and closing the valve.

Disposed next to the rainwater holding chamber 40 is a bypass chamber indicated generally by the numeral 70. The bypass chamber 70 is operative under certain conditions to channel rainwater around the rainwater holding chamber 40. For example, when the rainwater holding chamber 40 is filled, it will follow that rainwater entering the downspout 10 will be directed around the rainwater holding chamber 40 and downwardly through the bypass chamber 70 and out the bottom of the downspout 10. In addition, as discussed below, an inclined filter 60 is disposed across the top opening in the rainwater holding chamber 40. Filter 60 is inclined such that debris such as leaves, etc. will engage the top surface of the filter 60 and be deflected downwardly and to one side and into the bypass chamber 70. See FIG. 9, for example. Note that the bypass chamber 70 is formed in part by the left sidewall 14, the front wall 12, and the back wall 18 along with the intermediate wall 42. Thus, the intermediate wall is a common or shared wall inasmuch as it forms a part of the rainwater holding chamber 40 and the bypass chamber 70.

The downspout 10 can be provided with one or more adaptor caps 80. Note that an adaptor cap is secured to the sleeve 22 and includes an opening for receiving a downcomer 15 or other type of pipe or conduit that is effective to transfer rainwater from the gutters to the inlet of the downspout 10. See, for example, FIG. 9. Note the downcomer or conduit 15 that projects downwardly through an opening in the adaptor cap 80 such that it dispenses or directs rainwater into the upper portion of the downspout 10. Many conventional gutter systems come in various sizes. For example, some gutter systems are 4"×3" and other gutter systems are 3"×2". Therefore, in the case of the downspout 10 shown and described herein, it is contemplated that two adaptor caps would be provided. One adaptor cap 80 is designed to connect with a 4"×3" gutter. Thus, in this case, the adaptor cap 80 would include a 4"×3" opening. See the adaptor cap 80 shown in FIG. 13, for example. In another case, the adaptor cap 80 is provided with a 3"×2" opening in order to accept a 3"×2" gutter outlet or downcomer. See, for example, FIG. 12. In both cases, the adaptor cap 80 is designed to seat onto the inlet sleeve 22. See FIGS. 8 and 9, for example. Once seated or placed on the end sleeve 22, the adaptor cap 80 is secured thereto by thumb screws. Now the gutter outlet pipe or downcomer 15 can be directed downwardly into the opening found in the adaptor cap 80.

Figure 7:
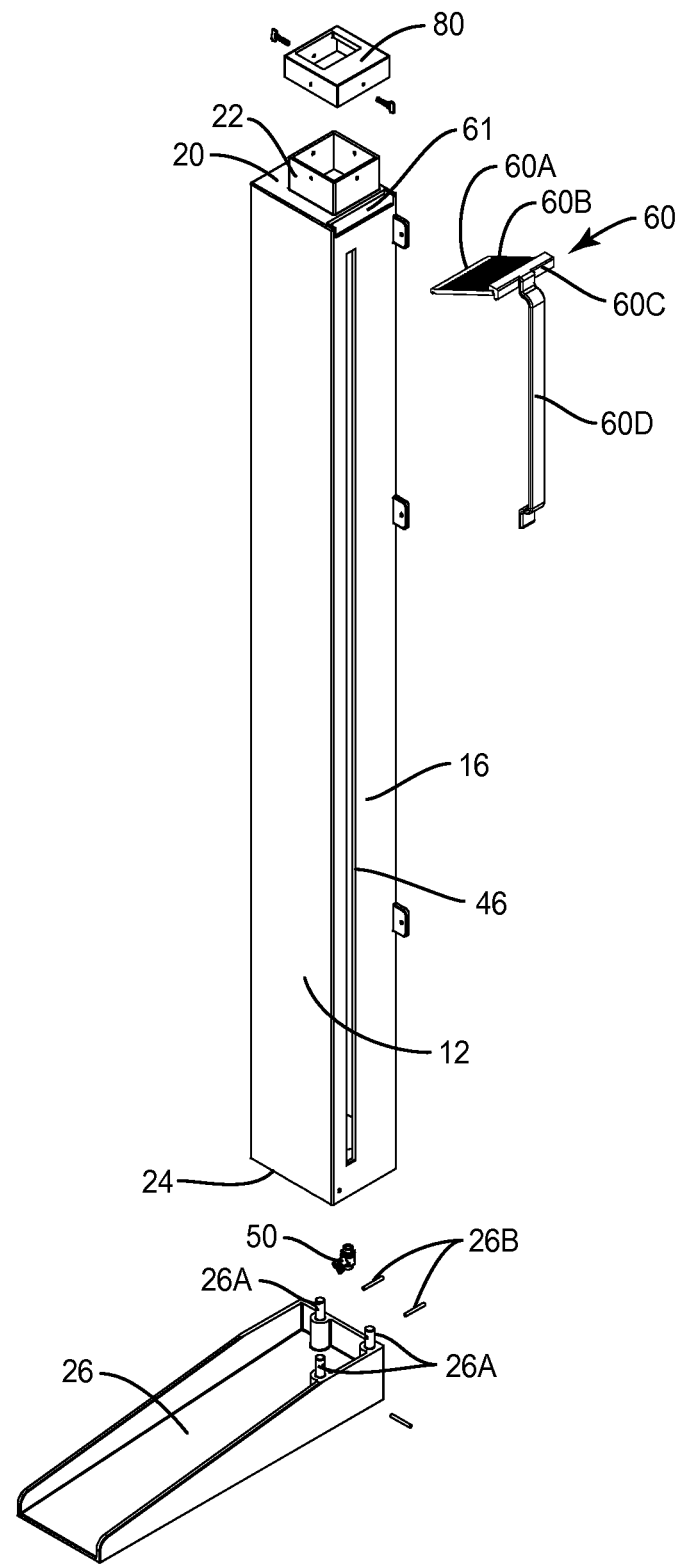
FIG. 7 is an exploded perspective view of the gutter downspout of the present invention.

As seen in the drawings, a filter indicated generally by the numeral 60 is designed to be easily inserted and removed from the downspout 10. In this regard, there is provided a filter slot 61 (FIG. 7) formed in the upper portion of the downspout 10. In particular, as seen in FIG. 7, the filter slot is formed about the edge or intersection of the top 20 with the right sidewall 16. Filter 60 is designed to be inserted through the filter slot 61 such that when inserted the filter closes the upper opening of the rainwater holding chamber 40. Note that the filter 60, when properly inserted into the downspout, is disposed at an angle within the downspout. As seen in FIG. 9, the filter 60 is inclined from the right sidewall 16 downwardly towards the intermediate wall 42. An outer portion of the filter 60 is designed to engage and rest on the upper terminal edge 42A of the intermediate wall 42. Note that the filter 60 is angled with respect to the inlet of the bypass chamber 70. Again, see FIG. 9. Thus, it is appreciated that leaves and other debris that are transferred from the gutter system 11 through the downcomer or gutter outlet 15 into the top portion of the downspout will tend to engage the upper surface of the filter and deflect off of the filter into the inlet area of the bypass chamber 70. Thus, leaves and other debris will tend to flow through the bypass chamber 70 and the presence of the filter prevents the rainwater holding chamber 40 from being clogged with such debris.

With respect to FIG. 11, there is shown a detailed design for one embodiment of the filter. In this case, the filter includes an outer terminal edge 60A that is designed to rest on the upper terminal edge 42A of the intermediate wall 42. Further, the filter 60 includes a filter body 60B that is formed of a perforated material such as plastic or metal. Further, the filter 60 includes an outer edge 60C that is designed to appropriately mate with the filter slot 61 so as to set and position the filter 60 appropriately. Extending from the outer edge 60C is a handle 60D that projects through the filter slot 61 and then turns at an angle and extends downwardly adjacent the right sidewall 16 of the downspout 10. See FIG. 8, for example. This means that the handle 60D can be reached easily and, by manipulating the handle, the filter 60 can be removed from the interior of the downspout and cleaned.

In operation, the downspout can assume two modes. In one mode, the downspout functions to collect and hold water that can be used in the same manner as if collected in rain barrels or cistern. In this case, rainwater entering the inlet 22 of the downspout 10 moves down and passes through the filter 60. The filter 60 is disposed in an opening overlying the rainwater holding chamber 40. The filter is positioned to catch and deflect trash and other debris into the bypass chamber 70. Once in the rainwater holding chamber 40, the rainwater is held and contained such that it can be used for irrigation and many other uses. It is appreciated that because of the elongated nature of the rainwater holding chamber 40 that the water in the chamber creates a head pressure at the bottom of the chamber. The downspout includes a certain height or length and, in one embodiment, the rainwater collection chamber 40 includes a height or length that is at least 75% of the height or length of the downspout. Thus, when water is directed from the rainwater holding chamber 40 for use in irrigation, plant watering, etc., the water will exit under pressure. This means that there is no requirement for a pump to pump water from the rainwater holding chamber 40. It is appreciated that by placing the control valve 50 on the outlet at the bottom of the rainwater holding chamber 40 that a homeowner, for example, can easily and conveniently control the flow of rainwater from the rainwater holding chamber.

There may be occasions when it may be desirable not to collect rainwater in the rainwater holding chamber 40. In those cases, the control valve 50 can be opened and rainwater flowing into the rainwater holding chamber 40 will flow through the chamber and out the control valve.

As discussed above, when the rainwater holding chamber 40 is full, then additional rainwater entering the downspout will bypass the rainwater holding chamber and flow through the bypass chamber and out the bottom of the downspout 10 in conventional fashion.

The downspout 10 described above has substantial utility. While functioning as a conventional downspout, the device also functions to collect and hold rainwater that can be used by a homeowner for various purposes. At the same time, there is no need for a pump to pump the water from the rainwater holding chamber 40. Further, one advantage of the integrated downspout 10 and rainwater holding chamber discussed herein is that of its pleasing esthetic features. There are no exposed rain barrels as such. The rainwater holding chamber is integrated into a conventional downspout and, hence, the device does not detract esthetically.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A gutter downspout for receiving and holding rainwater collected from a gutter system, comprising:
    an elongated outer housing having a surrounding wall, an upper end portion, and a lower end portion and wherein the elongated housing is adapted to connect to the gutter system and to extend downwardly therefrom;
    an inlet formed in the top portion of the gutter downspout and operative to receive rainwater from the gutter system;
    an outlet formed in the bottom portion of the gutter downspout for permitting rainwater to flow from the gutter downspout;
    an elongated integrated rainwater holding chamber formed inside the housing of the gutter downspout and wherein the rainwater holding chamber extends substantially along a length of the gutter downspout and includes an opening in a top portion thereof for permitting rainwater to flow from the inlet into the rainwater holding chamber;
    a valve formed in a lower portion of a rainwater holding chamber for controlling the flow of rainwater from the rainwater holding chamber;
    a rainwater bypass chamber formed adjacent the rainwater holding chamber and disposed inside the gutter downspout for permitting rainwater to flow through the bypass chamber and to bypass the rainwater holding chamber;
    a filter slot formed in the gutter downspout housing adjacent the opening in the rainwater holding chamber;
    a removable filter extending across the opening in the rainwater holding chamber for filtering debris from the rainwater passing into the rainwater holding chamber; and
    a filter handle attached to the filter and projecting therefrom through the filter slot to the exterior of the gutter downspout housing where the handle can be accessed.

2. The gutter downspout of claim 1 wherein the filter is disposed at an incline across the opening in the rainwater holding chamber and operative to deflect debris passing into the gutter downspout into the bypass chamber.

3. The gutter downspout of claim 1 wherein the rainwater holding chamber is formed in part by the surrounding wall of the housing and an intermediate wall that extends through the housing and wherein the intermediate wall separates the rainwater holding chamber from the bypass chamber and wherein the intermediate wall forms a part of both the rainwater holding chamber and the bypass chamber.

4. The gutter downspout of claim 3 wherein the intermediate wall includes an upper terminal edge that terminates below the inlet to the gutter downspout, wherein the filter extends at an incline from the surrounding wall of the housing to the upper terminal edge of the intermediate wall where a portion of the filter rests on the upper terminal edge of the intermediate wall.

5. The gutter downspout of claim 4 wherein the filter handle projects outwardly through the filter slot and turns downwardly and extends downwardly along an exterior side portion of the surrounding wall of the housing.

6. The gutter downspout of claim 1 further including a splash block disposed adjacent the lower end portion of the gutter downspout for redirecting the rainwater outwardly from the lower portion of the downspout.

7. The gutter downspout of claim 1 including an adaptor cap secured to the upper end portion of the gutter downspout for connecting to the gutter system.

8. The gutter downspout of claim 1 including a window formed in the rainwater holding chamber such that the amount of rainwater accumulated in the rainwater holding chamber can be seen.

9. A gutter downspout for receiving and holding rainwater collected from a gutter system, comprising:
- an elongated outer housing having a surrounding wall, an upper end portion, and a lower end portion and wherein the elongated housing is adapted to connect to the gutter system and to extend downwardly therefrom;
- an inlet formed in the top portion of the gutter downspout and operative to receive rainwater from the gutter system;
- an outlet formed in the bottom portion of the gutter downspout for permitting rainwater to flow from the gutter downspout;
- an elongated integrated rainwater holding chamber formed inside the housing of the gutter downspout and wherein the rainwater holding chamber extends substantially along a length of the gutter downspout and includes an opening in a top portion thereof for permitting rainwater to flow from the inlet into the rainwater holding chamber;
- an outlet formed in a lower portion of the rainwater holding chamber for directing rainwater from the rainwater holding chamber; and
- a rainwater bypass chamber formed adjacent the rainwater holding chamber and disposed inside the gutter downspout for permitting rainwater to flow through the bypass chamber and to bypass the rainwater holding chamber.

10. The gutter downspout of claim 9 wherein the rainwater holding chambers is formed in part at least by a portion of the surrounding wall of the housing and an intermediate wall that extends through the interior of the housing and extends substantially along the length of the gutter downspout; and wherein the bypass chamber is formed in part at least by a portion of the surrounding wall of the housing and the intermediate wall; and wherein the intermediate wall is a shared wall that is shared by the rainwater holding chamber and the bypass chamber.

11. The gutter downspout of claim 10 including a filter disposed interiorly of the gutter downspout and wherein the filter projects across the opening in the top portion of the rainwater holding chamber and is positioned in the gutter downspout to prevent debris from entering the rainwater holding chamber.

12. The gutter downspout of claim 11 wherein the gutter downspout includes a top and wherein the intermediate wall includes an upper terminal edge that terminates short of the top of the gutter downspout and wherein the filter projects inwardly from the surrounding wall of the housing and downwardly towards the upper terminal edge of the intermediate wall where an end portion of the filter engages and rests on the upper terminal edge of the intermediate wall such that the filter extends across the rainwater holding chamber at an incline.

13. The gutter downspout of claim 12 wherein the inclined orientation of the filter and its position relative to the bypass chamber causes debris that enters the gutter downspout to engage the inclined filter at which point the debris is deflected into the bypass chamber.

14. The gutter downspout of claim 13 wherein the housing includes a filter slot disposed in the surrounding wall thereof about the upper portion of the gutter downspout and wherein the filter projects inwardly from the filter slot across the rainwater holding chamber and wherein the filter includes a handle that projects from the filter and along an exterior side of the surrounding wall of the housing.

15. The gutter downspout of claim 14 including one or more adaptor caps configured to connect to the top portion of the gutter downspout and wherein the adaptor cap is adapted to connect to a connecting section that forms a part of the gutter system such that rainwater collected in the gutter system can be directed through the adaptor cap into the gutter downspout.

16. The gutter downspout of claim 15 wherein the gutter downspout includes a splash pad that is configured to join the lower portion of the housing such that rainwater passing through the bypass chamber is directed onto the splash pad and outwardly from the gutter downspout.

17. The gutter downspout of claim 9 including a window formed in the rainwater holding chamber such that the amount of rainwater accumulated in the rainwater holding chamber can be seen.

* * * * *